L. A. HILL.
MOTOR VEHICLE.
APPLICATION FILED NOV. 4, 1911.

1,046,388.

Patented Dec. 3, 1912.
3 SHEETS—SHEET 1.

Witnesses

Inventor
Louis A. Hill
By G. Ayres
Attorney

L. A. HILL.
MOTOR VEHICLE.
APPLICATION FILED NOV. 4, 1911.
1,046,388.
Patented Dec. 3, 1912.
3 SHEETS—SHEET 2.
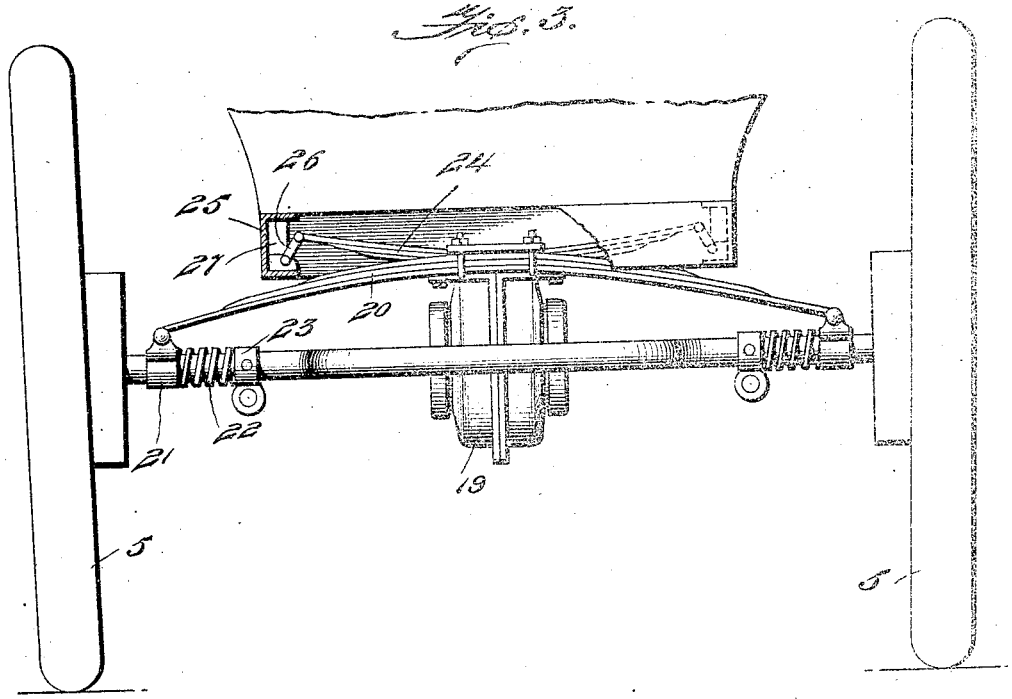
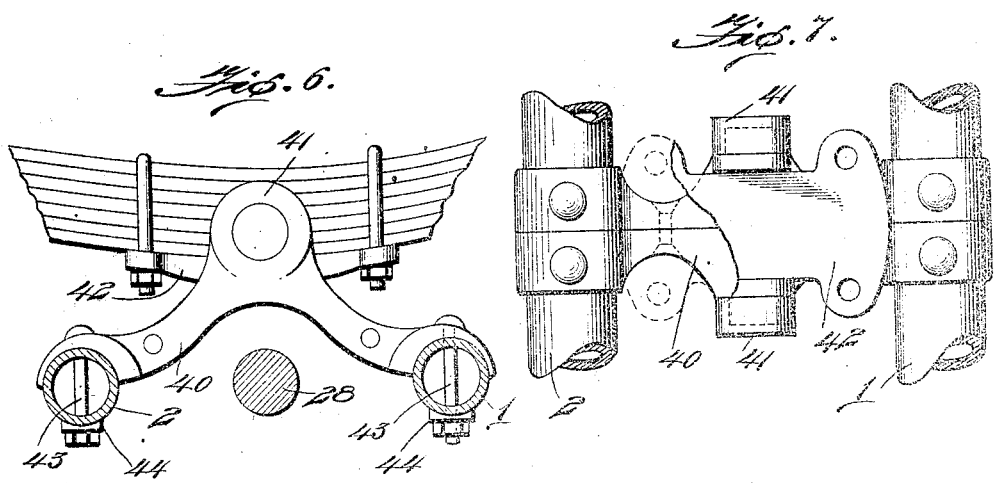
Witnesses
Inventor
Louis A. Hill
By
Attorney

L. A. HILL.
MOTOR VEHICLE.
APPLICATION FILED NOV. 4, 1911.

1,046,388.

Patented Dec. 3, 1912.

3 SHEETS—SHEET 3.

Witnesses

Inventor
Louis A. Hill
By
Attorney

UNITED STATES PATENT OFFICE.

LOUIS A. HILL, OF WASHINGTON, DISTRICT OF COLUMBIA, ASSIGNOR TO PNEUCAR COMPANY, OF WASHINGTON, DISTRICT OF COLUMBIA, A CORPORATION OF DELAWARE.

MOTOR-VEHICLE.

1,046,388.

Specification of Letters Patent.

Patented Dec. 3, 1912.

Application filed November 4, 1911. Serial No. 658,570.

*To all whom it may concern:*

Be it known that I, LOUIS A. HILL, a citizen of the United States, residing at Washington, in the District of Columbia, have invented certain new and useful Improvements in Motor-Vehicles, of which the following is a specification.

My invention relates to improvements in motor vehicles, and it consists in the constructions, combinations and arrangements herein described and claimed.

An object of my invention is to provide an improved shaft-drive motor vehicle, in which the body and drive mechanism are resiliently supported for independent relative movement on the running gear; thereby eliminating troublesome dead load on the running gear, and insuring a steady and efficient drive under all practical conditions.

A further object of my invention is to provide an improved shaft-drive motor vehicle, in which the drive mechanism is resiliently connected to the body and running gear by resilient supports between said body and gear; whereby the inertia of the resiliently connected body acts to yieldingly resist shifting of the drive mechanism relative to the running gear, and to minimize the angular swing of the transverse, Cardan drive-shafts.

Figure 1:
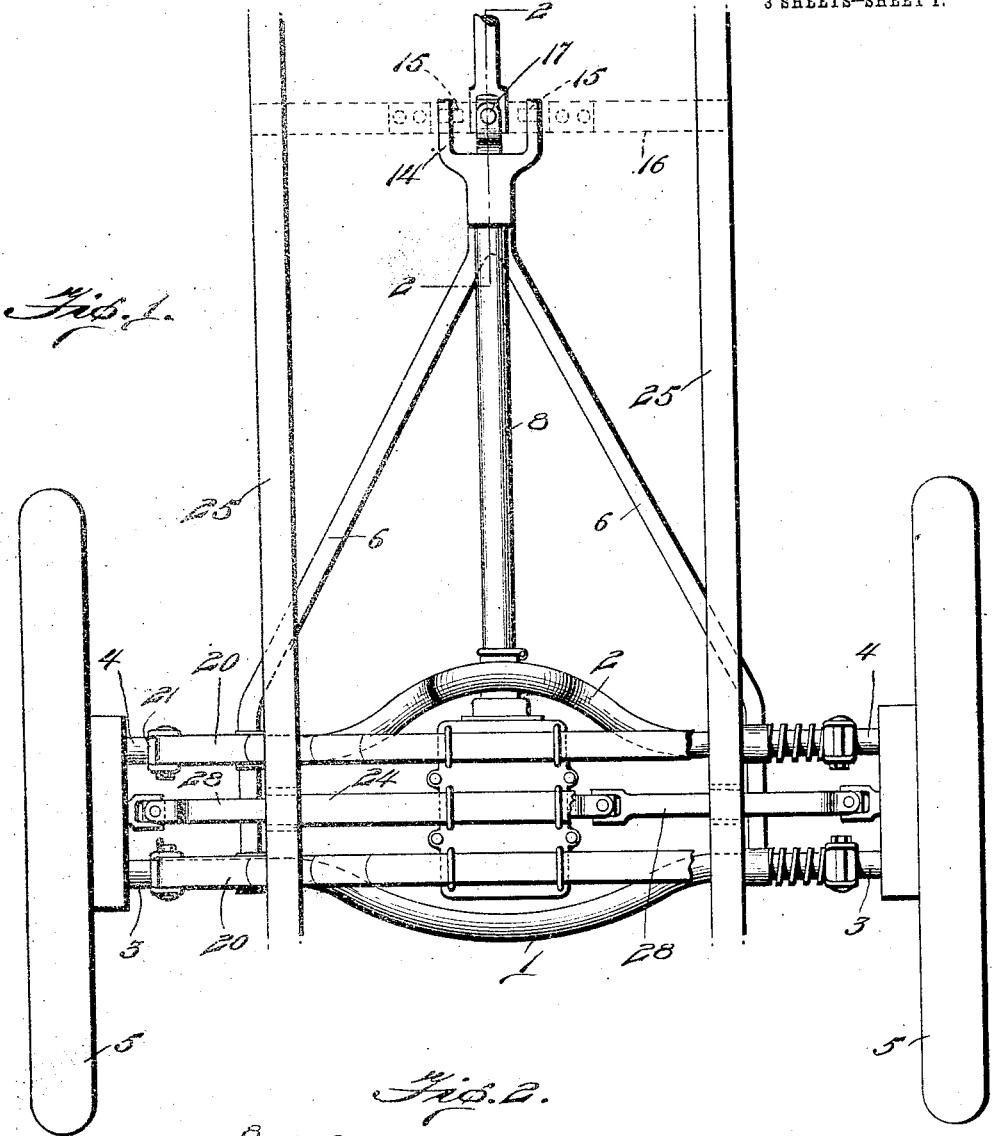
Figure 2:
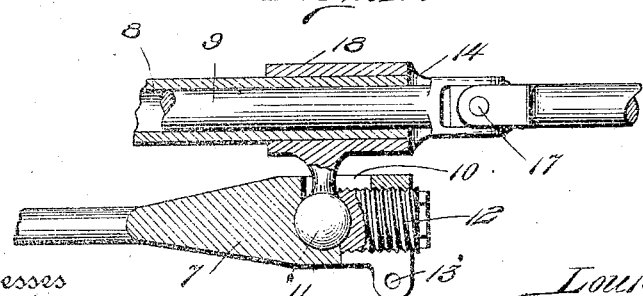
Figure 4:
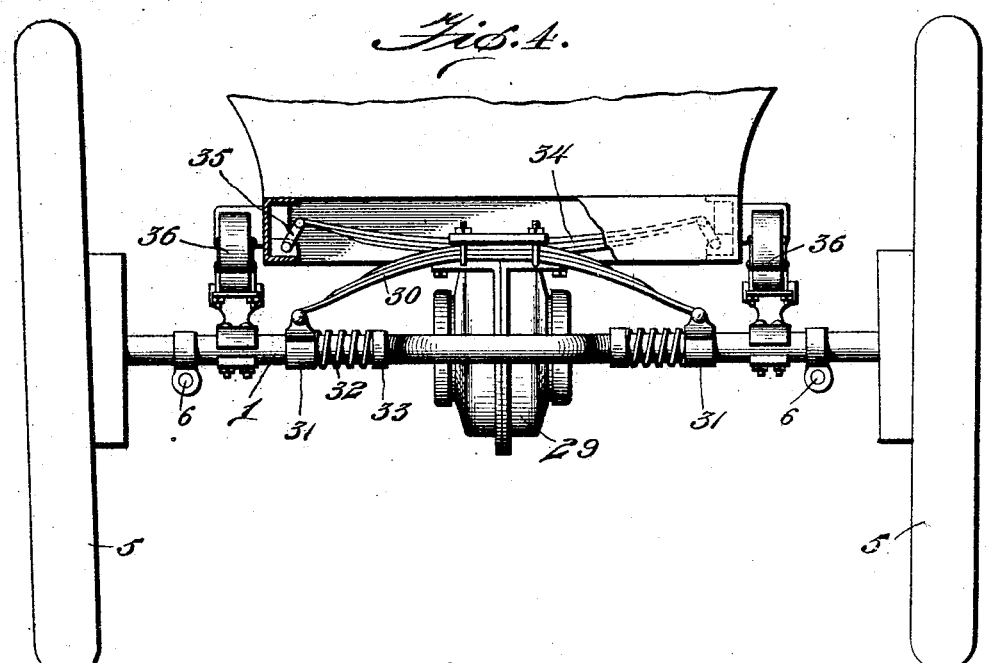
Figure 5:
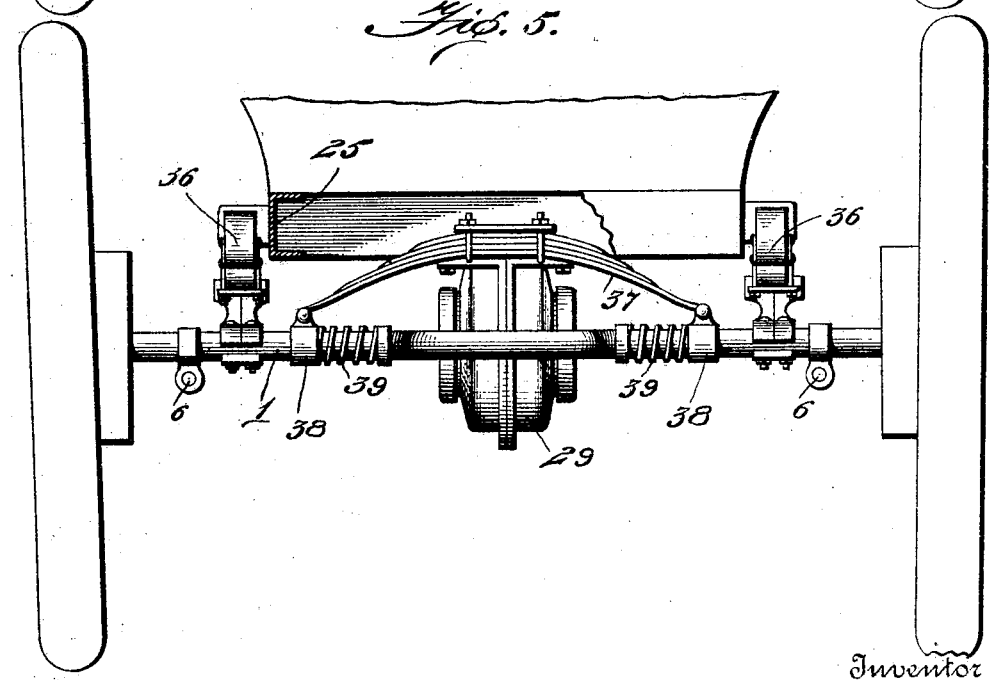

In the accompanying drawings, forming a part of this application, and in which similar reference symbols indicate corresponding parts in the several views: Figure 1 is a fragmentary plan view, illustrating the chassis and drive mechanism resiliently supported for independent relative movement on the running gear; Fig. 2 is an enlarged detail section on the line 2—2 of Fig. 1; Fig. 3 is a rear elevation of the construction shown in Fig. 1; Fig. 4 is a rear elevation, illustrating a modified construction; Fig. 5 is a rear elevation, illustrating a further modification; Fig. 6 is an enlarged detail section on the line 6—6 of Fig. 5, and Fig. 7 is a plan view of the construction shown in Fig. 6.

Referring to the drawings, 1 and 2 indicate rigid axles curved to clear the drive mechanism and connected off-center at 3 and 4 to the hubs of ground wheels 5; thrust members 6 being connected to the axles 1 and 2, and constituting with the latter a strong and rigid axle frame. The forward ends of the members 6 are provided with a head 7, which is supported for universal movement by a ball-and-socket joint secured to the casing 8 of the propeller shaft 9. For convenient assembling of the universal joint, the head 7 is provided with a key-hole slot 10 for insertion of the ball 11, and with a socket plug 12 threaded in a split portion of said head, which is apertured at 13 to receive a clamping bolt.

A yoke 14 on the forward end of the casing 8 is pivoted at 15 to a cross-member 16 of the chassis, in line with the usual universal joint 17 of the propeller shaft 9. I have shown the yoke 14 and ball 11 formed integral with a sleeve 18 which is rigidly secured to the propeller-shaft casing 8.

In the above described construction, all driving action of the ground wheels 5 is transmitted directly through a rigid axle frame, which is supported for universal movement relative to the chassis and the drive mechanism.

The differential gear 19 is resiliently supported on the axle frame by one or more springs 20 carried by sleeves 21 slidably mounted on the axles 1 and 2; auxiliary or buffer springs 22 being confined between said sleeves 21 and collars 23 on the axles, for yieldingly maintaining said sleeves in normal position and resisting shifting of the differential gear from central position. I have shown transverse drive-shafts 28 of known type. The chassis is resiliently supported on the differential 19 by a spring 24, which is connected to the longitudinal chassis members 25 by links 26 positioned to engage yielding buffers 27 for limiting and cushioning their extreme swing. This constitutes an improved construction, in which the buffer springs 22 and the mass of the vehicle body act to yieldingly resist shifting of the resiliently-supported differential relative to the running gear; thereby minimizing the angular deflection of the transverse drive-shafts 28, and insuring a steady and efficient drive under all practical conditions.

Fig. 4 illustrates a modification, in which the chassis is supported on the axle frame by any usual form of side springs 36. The differential 29 is supported by one or more springs 30 carried by sleeves 31 slidably mounted on the axle frame; auxiliary springs 32 being confined between said sleeves 31 and collars 33 on said frame. The chassis is additionally supported by a leaf spring 34 connected thereto by links 35 and carried by the differential 29.

Fig. 5 illustrates a modification, in which the chassis is supported on the axle frame by side springs 36; the differential being resiliently supported by a spring 37 carried by sleeves 38 slidably mounted on said frame in engagement with buffer springs 39.

Figs. 6 and 7 illustrate a preferred means for supporting the side springs of Figs. 4 and 5 on the axle frame, to allow free play of the transverse drive-shafts 28. In this construction, arched brackets 40 are secured to the axles 1 and 2 and provided with ears 41, on which is pivotally supported a seat 42 for said side spring. For convenience in assembling, the bracket 40 is shown formed in two parts which are rigidly secured to the axles by bolts 43 extending therethrough and through clamping plates 44 bearing on said axles.

My invention provides an improved construction, in which the drive-mechanism and vehicle-body are resiliently supported for independent relative movement on a rigid axle frame, which latter is connected for free universal movement relative to said mechanism and body; thereby eliminating all troublesome dead weight on the running gear, and insuring an efficient and steady shaft drive under all conditions.

I claim:

1. In a motor vehicle provided with a body and ground wheels, the combination of a frame supported on said wheels, a power device supported on the body, a differential drive mechanism, a support for resiliently resisting all shifting of said drive mechanism from normal central position and for carrying said drive mechanism for movement relative to said body and frame, a universal power-transmitting connection between said power device and drive mechanism, and universal drive connections between said drive mechanism and ground wheels.

2. In a motor vehicle provided with a body and ground wheels, the combination of a frame supported on said wheels, shiftable resilient supports for said body, yielding means on said frame for normally maintaining said shiftable supports in central position, drive mechanism for the ground wheels, and means for resiliently supporting said mechanism for movement independently of said body and frame.

3. In a motor vehicle provided with a body and ground wheels, the combination of a frame supported on the ground wheels, a universal thrust-connection between said frame and body, resilient supports for the body shiftably mounted on said frame, yielding means for normally maintaining said shiftably-mounted supports in central position, drive mechanism for the ground wheels, and means for resiliently supporting said mechanism for movement independently of said frame and body.

4. In a motor vehicle provided with a body and ground wheels, the combination of a frame supported on the ground wheels, a universal thrust-connection between said frame and body, resilient supports for the body, connections slidably mounting said resilient supports on said frame, yielding means engaging said connections for maintaining the latter in normal position, drive mechanism for the ground wheels, and means for resiliently supporting said mechanism for movement independently of said frame and body.

5. In a motor vehicle provided with a body and ground wheels, the combination of a frame supported on the ground wheels, drive mechanism for the ground wheels, means for resiliently supporting said mechanism on said frame, and means for resiliently supporting said body on said drive mechanism.

6. In a motor vehicle provided with a body and ground wheels, the combination of a frame supported on said wheels, a drive mechanism, resilient means shiftably mounted on said frame for supporting said drive mechanism for movement independently of said body and frame, and buffer devices on said frame for yieldingly resisting shifting of said resilient means.

7. In a motor vehicle provided with a body and ground wheels, the combination of a frame supported on said wheels, a resilient support, links connecting said support and body, cushioning buffers for limiting the swing of said links, means for shiftably mounting said resilient support on said frame, and yielding means for normally maintaining said shiftably-mounted support in central position.

In testimony whereof I affix my signature in presence of two witnesses.

LOUIS A. HILL.

Witnesses:
 HENRY E. COOPER,
 G. AYRES.